(12) United States Patent
Ostholt

(10) Patent No.: US 6,398,055 B1
(45) Date of Patent: Jun. 4, 2002

(54) DEVICE FOR STORING PRESSURIZED GAS

(75) Inventor: Rüdiger Ostholt, Wetter (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/646,407

(22) PCT Filed: Mar. 9, 1999

(86) PCT No.: PCT/DE99/00717
§ 371 (c)(1),
(2), (4) Date: Sep. 18, 2000

(87) PCT Pub. No.: WO99/47850
PCT Pub. Date: Sep. 23, 1999

(30) Foreign Application Priority Data

Mar. 18, 1998 (DE) ......................... 198 12 904

(51) Int. Cl.[7] ............................................. B65D 21/00
(52) U.S. Cl. .................... 220/23.4; 220/23.83; 220/4.12
(58) Field of Search ............................. 220/23.4, 23.83, 220/4.12, 4.03

(56) References Cited
U.S. PATENT DOCUMENTS 3,886,885 A * 6/1975 Becker et al. ............ 114/74 A

* cited by examiner

Primary Examiner—Mickey Yu
Assistant Examiner—Troy Arnold
(74) Attorney, Agent, or Firm—Cohen, Pontani, Lieberman & Pavane

(57) ABSTRACT

A device for storing compressed gas having a plurality of storage containers which each have a container wall which surrounds a cavity provided for storing the compressed air. The storage containers are connected to one another, and have at least one connection for introducing and/or discharging the compressed gas. In order to configure the storage containers so that they are as stable as possible, each of the storage containers has a covering layer which is arranged on the container wall at least in partial regions of the particular storage container. In order furthermore to enable the geometrical structure of the device to be adapted individually to the available spaces and to the quantity of gas to be stored, provision is made for each storage container to have a head piece which is connected to the container wall, and for the storage containers to be connected or able to be connected to one another in a modular manner via the respective head pieces. The compressed gas is conducted out of the storage containers via a flow duct which is provided in the head pieces and communicates with the cavity of the respective storage containers via a hole. The individual head pieces are connected via connecting elements which are introduced into corresponding openings in the head pieces.

27 Claims, 4 Drawing Sheets

DEVICE FOR STORING PRESSURIZED GAS

BACKGROUND OF THE INVENTION

1. Field of the Invention

The present invention relates to a device for storing compressed gas, having a plurality of storage containers which each have a container wall which surrounds a cavity provided for storing the compressed gas, the storage containers one conductively connected to one another and each storage container has a head piece which is connected to the container wall, and at least one connection for introducing and/or discharging the compressed gas.

2. Discussion of the Prior Art

Gases are conventionally transported in special containers which firstly prevent the gases from evaporating and secondly have to be of sufficiently stable design that the gas cannot be suddenly released in the event of the container being damaged. Furthermore, these containers, if they are used for example for storing gases at high pressure, have to have an extremely firm and stable container wall. Containers of this type for compressed gas conventionally consist of steel or of another metal. In this case, for reasons concerned with strength, either spherical shapes or cylindrical shapes are preferred. However, containers of this type have the disadvantage firstly of having a very high dead weight even when empty. Furthermore, the quantity of gas which can be stored is severely restricted by the existing geometry of the container.

With regard to increasing the quantity of gas which can be stored, U.S. Pat. No. 5,577,630 discloses a pressure container which is used for storing natural gas. This container consists of a row of elongated storage elements which consist of plastic and are arranged next to one another. In this case, the storage elements are mutually supported via the touching walls. The storage structure has a woven fabric wrapped around it in order to increase the strength of the container. By arranging a plurality of storage elements next to one another a single pressure container is provided which, in contrast to the previously conventional, cylindrical pressure containers, is able to hold a substantially greater quantity of compressed gas. Since, however, the individual storage elements are surrounded by a single covering layer, it is not possible for the container to be individually adapted in its geometrical shape to different requirements. Furthermore, the known container has the disadvantage that in the event of damage to a single storage element the entire container has to be replaced.

Furthermore, gas-transporting vehicles are known where compressed gas is stored in large, bottle-like containers which are arranged lying parallel to one another and can communicate with one another at their end sides through corresponding connecting conduits. The individual containers, which are formed from steel pipes, can have a fiber material wrapped around their cylindrical part in order to increase the strength and are held together by an external supporting frame.

SUMMARY OF THE INVENTION

Starting from the above-mentioned prior art, the present invention is based on the object of developing a device for storing compressed gas in such a manner that the disadvantages mentioned in the prior art are avoided. In particular, the intention is to provide a device for storing compressed gas which firstly has sufficient strength with regard to the gas to be stored and which secondly can be adapted individually in its geometrical structure to the available space and to the quantity of gas to be stored.

Pursuant to this object, and others which will become apparent hereafter, one aspect of the present invention resides in a device for storing compressed gas, which device includes a plurality of storage containers which each have a container wall that surrounds a cavity in which the compressed gas is stored. In the gas storage facility according to the invention, each storage container has a head piece which is connected to the container wall. The storage containers are connected or can be connected to one another mechanically and in a modular manner to form a compact constructional unit via the respective head pieces arranged directly next to one another in a row. The head pieces are therefore in mutual contact. In order to increase the strength or to protect the gas storage facility, it is advantageous if each of the storage containers has an additional covering layer which is arranged on the container wall at least in partial regions of the particular storage container.

This results in the provision of a device for storing compressed gas which can be matched individually to the most varied requirements. The device can be expanded or reduced by an appropriate number of storage containers depending on the quantity of gas to be stored. As a result, not only can the quantity of gas to be stored be varied, but it is also possible to adapt the device to the available space. The individual storage containers can namely be arranged both next to one another and above one another, with the result that the geometry of the device which is provided can deviate altogether from the previous spherical or cylindrical configurations.

Should one of the storage containers be damaged during use of the device and therefore have to be replaced, the corresponding storage container can be removed from the entire device and replaced by a new storage container. Replacement of the entire device can therefore be avoided This results, inter alia, in a considerable reduction of costs. Furthermore, it is possible for the device to continue to be used during replacement of the damaged storage element if appropriate shut-off valves are provided. This leads to a reduction in the down times of the installations operating using the device.

In order to obtain storage containers having particularly high strength, the covering layer can be arranged on the outer surface of the container wall. However, it is also possible for the covering layer to be arranged on the inner surface of the container wall or within the container wall. Of course, particularly if a plurality of covering layers are used, it is also possible for the various options of arranging the covering layer/covering layers to be combined.

For example, the container wall may be of single-part or multipart design. However, in the case of the multipart configuration of the container wall, it has to be ensured that the individual parts are suitably connected to one another in a gastight manner.

The individual storage containers can be produced in a simple and cost-effective manner and connected to one another in just as simple a manner, which results in a high saving on costs during the production of the device according to the invention.

According to the invention, the head piece can be connected to the container wall by bonding, preferably by means of soldering or welding. Of course, other forms of connection are also conceivable; it is merely important for the head piece and the container wall to be connected to one another in a gastight manner and, depending on the permissible gas pressure, in a sufficiently resistant manner to shearing and extension.

In a further refinement, the storage containers can be of cylindrical design. The cylindrical shape of the container wall provides optimum strength properties with regard to the prevailing expansion pressure of the stored gas. In an expedient refinement, a storage container may, for example, have an internal diameter of 56 cm and an external diameter of 60 cm.

In a further refinement, a storage container has a conical cross-sectional tapering in its end region used to hold it in the head piece. It is advantageous for the side walls of the head piece, which are in contact with the cross-sectional tapering of the storage container, to be of corresponding design. This results in a further improvement in the strength of the connection between the head piece and the container wall. Furthermore, the cross-sectional tapering of the ends of the container wall enables the storage containers to be packed particularly densely within the device.

In another embodiment, connecting elements are provided for connecting the storage containers. The connecting elements can preferably be of rod-shaped design. For example—but not exclusively—it is possible for the connecting elements to have the function of tension rods and to be designed as threaded rods or expansion screws. This makes it possible to connect the storage containers releasably to one another via the head pieces.

In a further embodiment each of the head pieces has at least one, preferably two openings for holding the connecting elements. In this case, the diameter of the openings advantageously approximately corresponds to the outer diameters of the connecting elements. The at least one opening expediently extends continuously over the entire width of the head piece. As a result, a common connecting element can be used for the connection of the individual storage containers. The connecting element is passed through all of the head pieces, so that the head pieces, particularly if two openings in each case are provided, can be oriented such that they are aligned and in a straight row next to one another. This is particularly advantageous if—as is explained in detail below—the head piece is provided with a flow duct through which the compressed gas is guided after it has emerged from the cavity of the storage container. In this case, it is particularly important, in order to form a uniform flow duct, for the head pieces not to be displaced with respect to one another.

When a connecting element, for example a threaded rod, passing through all of the head pieces is used, suitable fastening elements can be provided in the region where the connecting element emerges from the outer head pieces in each case. Examples of suitable fastening elements are nuts or the like.

If, for example, a damaged storage container is to be replaced, the fastening elements are released from the connecting element enabling the individual storage containers to be separated from one another. The damaged storage container can then be replaced within a very short time by a new storage container. The individual storage containers are pushed together again and connected securely to one another via the fastening elements.

It is possible in principle to connect the storage containers to one another by separate pipelines. However, it can be particularly advantageous, as has already been described above, to provide a flow duct for passing the compressed gas through in the head piece. This flow duct extends continuously over the entire width of the head piece. It is used for conducting away the gas emerging from the storage containers and has, in a preferred embodiment, an internal diameter of approximately 8 mm. However, the invention is not restricted to the use of specific diameters for the flow duct.

According to the invention, the flow duct can have a respective sealing element in the end-side end regions of the head piece. A sealing element of this type, which may for example be an O-ring or the like, is used for connecting the individual head pieces to one another in a gastight manner, particularly in the region of the flow duct. The flow duct can communicate with the cavity of the storage container via a hole.

A valve, preferably a nonreturn valve, can advantageously be arranged in the hole. The valve can take on the function of a restrictor or a flow controller. This is particularly of advantage if the storage container is damaged. Gas which flows from the remaining storage containers into the flow duct is thereby prevented from being able to emerge from the device via the damaged storage container. For this purpose, in normal operation of the device the valve is open on account of the high gas pressure prevailing in the storage container. If the storage container should, for example, burst open or be damaged in another manner, the valve is closed on account of the falling pressure in the storage container and of the gas pressure prevailing in the flow duct. The gas stored in the other storage containers is therefore unable to escape, and in spite of the damaged storage container the device can also continue to be used.

In a further refinement, at least one of the head pieces can have a connection opening. A plurality, for example, of storage containers connected in a row can be connected to other rows of storage containers via such a connection opening. Because of the corresponding connection opening, an arrangement of the storage containers next to one another and also above one another is therefore possible.

According to the invention, the storage container can have a cover element at that end of the container wall which is opposite the head piece. The cover element, which preferably consists of the same material as the head piece, can likewise be connected to the container wall by welding, soldering or the like. Of course, other types of connection are also conceivable here; the important thing again is for the cover element to be connected to the container wall in a gastight manner and, in the direction of the longitudinal axis of the container, in a manner which is resistant to extension.

In a preferred design, the head piece and/or the cover element can consist of metal, preferably of cast material. In particular, precision castings can be used as the material.

According to the invention, the container wall can be formed from a material which is suitable in particular for absorbing forces in the longitudinal direction of the storage container. The container wall can preferably be formed from metal, plastic and/or a fiber composite material.

The container wall may, for example, be formed from polypropylene, in particular from polypropylene having long fibers. In this case, the fibers of the polypropylene are preferably oriented in the direction of the longitudinal axis of the container. Of course, the container wall may also consist of other materials. In this case, particular care should be taken to ensure that the material is as gastight as possible, i.e. does not allow any significant diffusion of the gas to be stored through the container wall. If fiber composite materials are used for the container wall, these may contain, for example—but not exclusively—glass fibers, aramide fibers, boron fibers, organic polymer fibers, carbon fibers or other types of fiber. The only important thing is for the fibers to have sufficiently high strength in order to be able to withstand the expansion pressure of the gases stored in the container. If a metal is used for the container wall, preference is given here to steel, in particular ST 52.

In a further embodiment of the invention, the container wall can be reinforced by an additional covering layer of a material which is suitable in particular for absorbing forces in the circumferential direction of the storage container. Materials of this type are preferably plastic and/or fiber materials. Examples which can be mentioned of further preferred materials are the materials described with regard to the gastight container wall. The covering layer itself does not need to be gastight.

The gases to be stored may, for example, be gaseous fuels, such as natural gas or hydrogen, or air, oxygen, nitrogen or else technical gases or the like. The invention is not restricted to any particular type of compressed gas.

BRIEF DESCRIPTION OF THE DRAWINGS

The invention is described in greater detail using an exemplary embodiment and by reference to the attached drawing, in which.

DETAILED DESCRIPTION OF THE PREFERRED EMBODIMENTS

Figure 1:
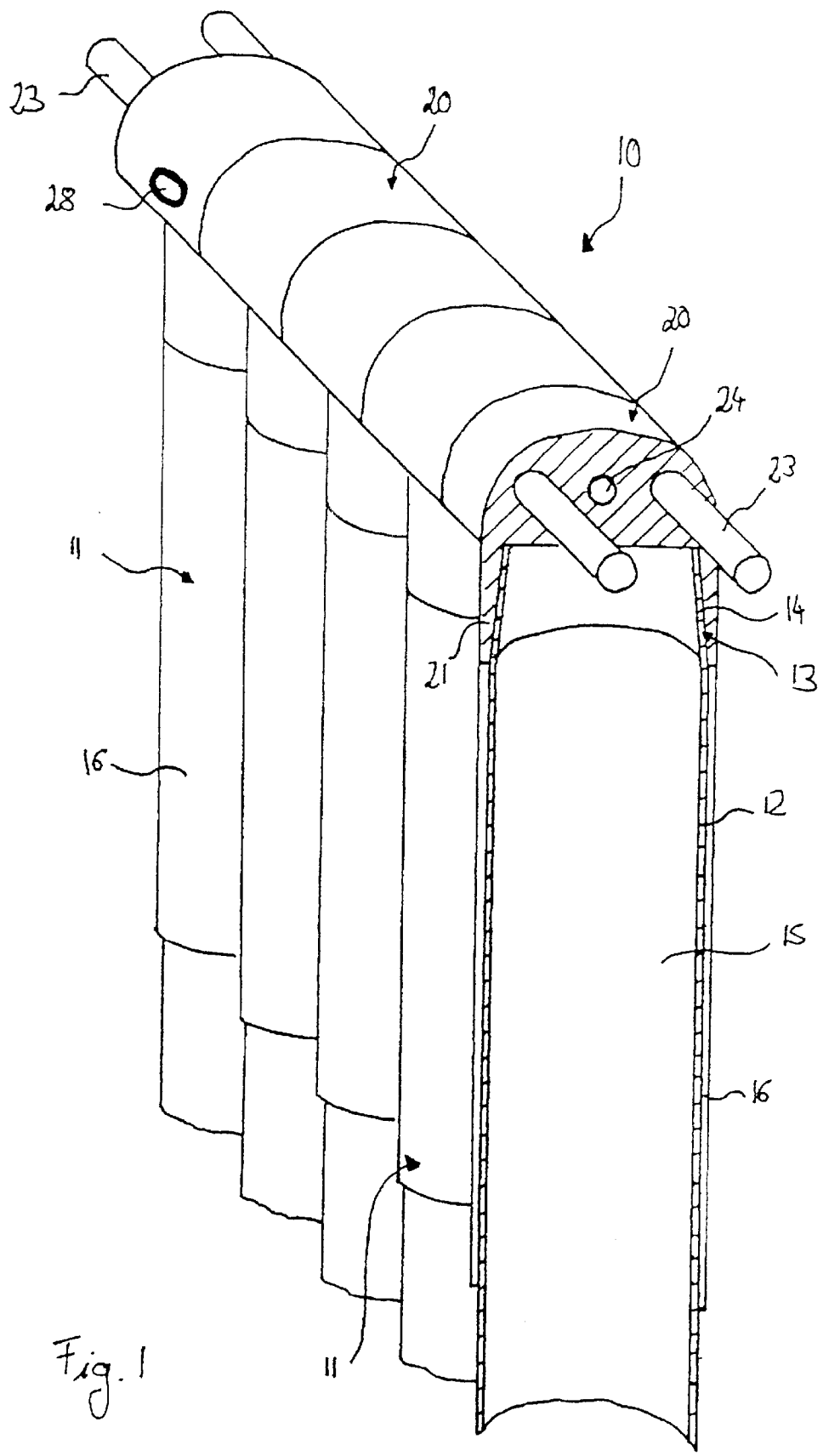
FIG. 1 shows a perspective view of the device according to the invention.
Figure 2:
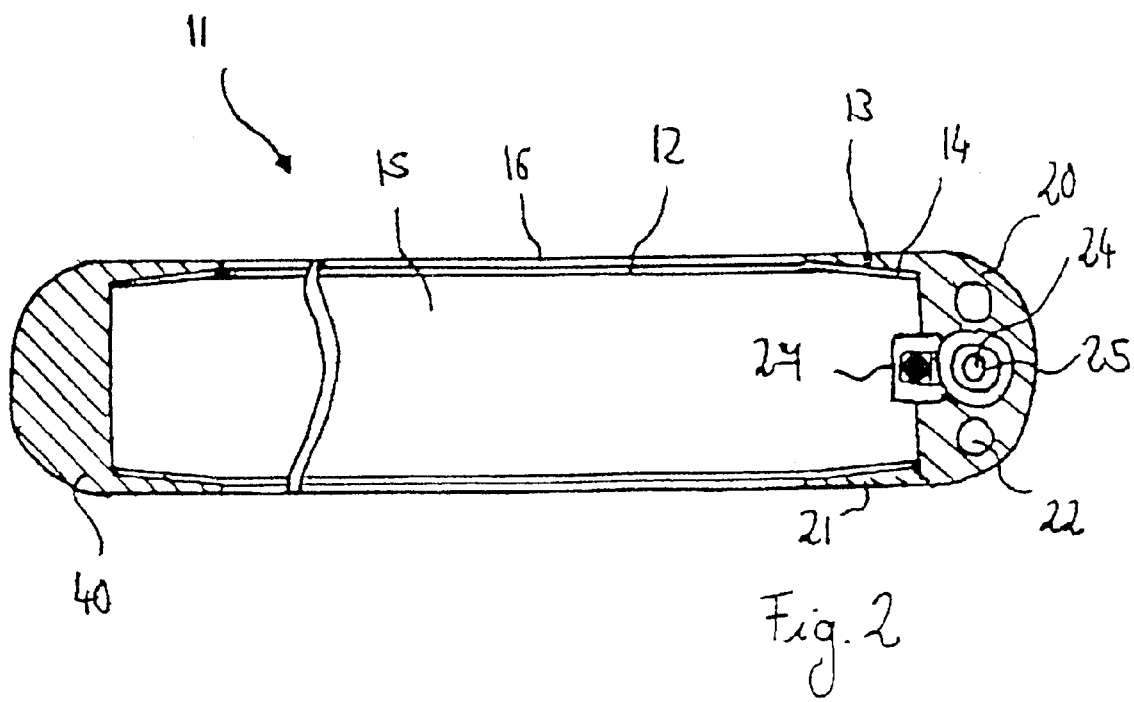
FIG. 2 shows a cross section through a storage container used in the device according to the invention.

In FIG. 1, a device 10 for storing compressed gas is illustrated. The device 10 has a plurality of storage containers 11 which are connected to one another via head pieces 20. As is additionally also illustrated in FIG. 2, the storage containers 11 have a container wall 12 which is produced from a metallic material, preferably from steel. This enables the container wall 12 to advantageously absorb and compensate for longitudinal stresses which are exerted by the compressed gas stored in the storage container 11. The container wall 12 surrounds a cavity 15 provided for storing the compressed gas. So that the even higher stresses in the circumferential direction of the storage container 11 can be compensated for by the container wall 12, a covering layer 16 is additionally provided on the outer surface of the container wall 12. The covering layer 16 expediently consists of wound carbon fibers which are held by a duroplastic or thermoplastic matrix. The container wall 12 is sealed in its respective end regions by means of a cover element 40 and the head piece 20. The cover element 40 and the head piece 20 consist of fine castings and are bonded to the container wall 12 by means of a solder connection. The cavity 15 is thereby closed on all sides in a gastight manner. In order additionally to increase the strength of this connection and to keep the packing density of the storage containers 11 in the device 10 as high as possible, the storage containers 11 have a conical cross-sectional tapering 14 in their end region 13 which is used to hold them in the head pieces 20. The side walls 21 of the head piece 20 and the side walls of the cover element 40 are of a corresponding design to the configuration of these cross-sectional taperings.

For the modular connection of the individual storage containers 11, the head pieces 20, which are of solid construction, each have two openings 22 for holding connecting elements 23. In this case, the openings 22 extend over the entire width of the head pieces 20. Furthermore, the head pieces 20 are provided with a flow duct 24 which likewise extends over the entire width of the head pieces 20. The flow duct 24 communicates with the cavity 15 of the respective storage container 11 via a hole 26. A nonreturn valve 27 is provided within the hole 26. To reliably seal the head pieces 20, which are arranged next to one another in a row, in the region of the flow duct 24, sealing elements 25, which are designed as an O-ring, are provided on the end sides of the head pieces 20 at the outer ends of the flow duct 24.

When the device 10 is assembled, the individual storage containers 11 are joined together in such a manner that both the openings 22 and the flow duct 24 are oriented aligned in a straight line. The connecting elements 23, which can be designed as threaded rods, are then inserted into the openings 22 and guided through all of the head pieces 20. In order to hold the storage containers 11 in the given position, fastening elements designed as nuts 29 are provided on the outer, exposed ends of the connecting elements 23 (see FIG. 5). The connecting elements 23 thereby perform the function of a tie rod.

Figure 5:
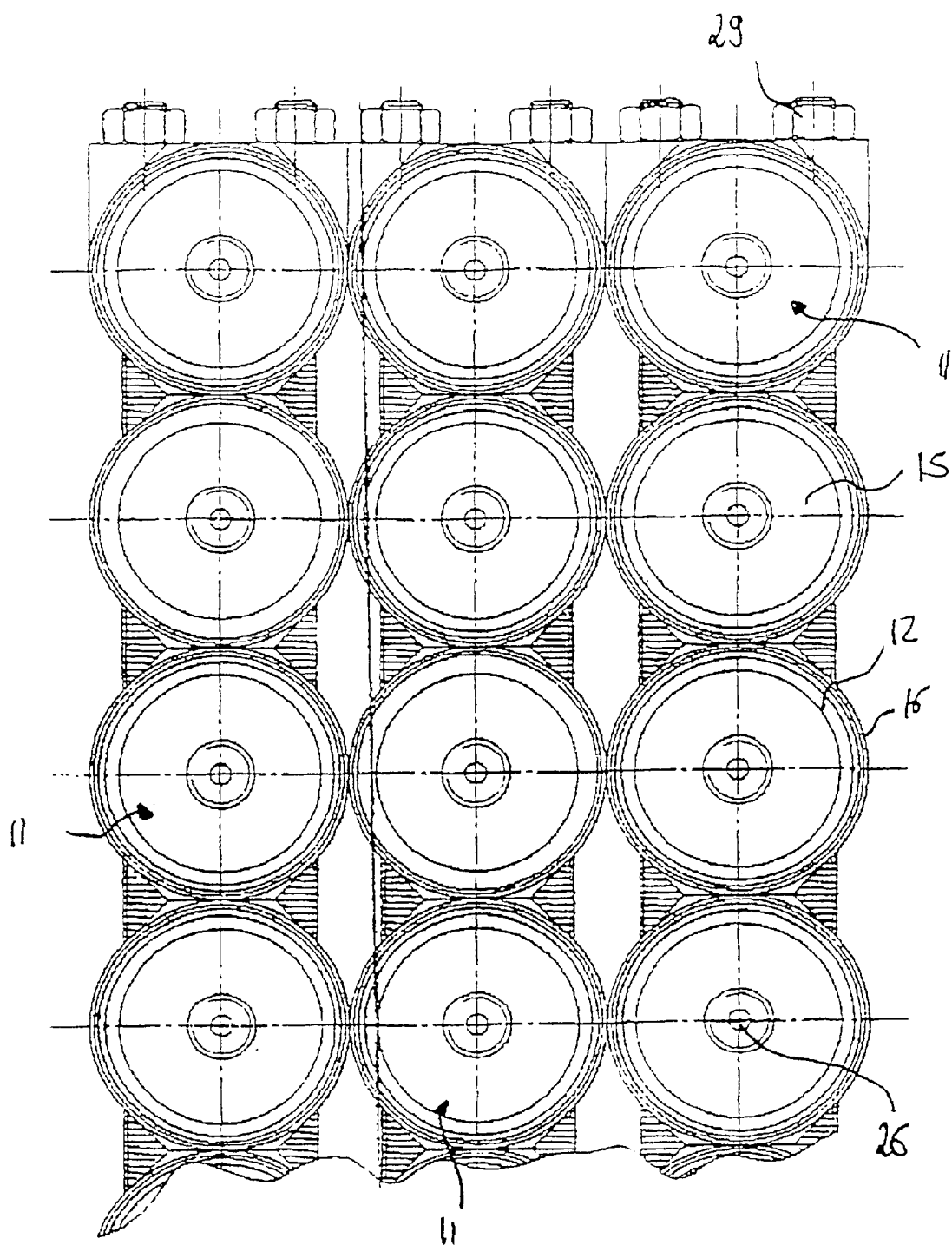
FIG. 5 shows a variant on the arrangement of a plurality of storage containers in the device according to the invention.

In order to be able to arrange the individual storage containers 11 not only in a row, but also mounted above one another, at least one head piece 20 has a connection opening 28. The flow duct 24 of one row of storage containers 11 arranged next to one another is connected to the flow duct of another row of storage containers via the connection opening 28, resulting in a, for example cuboid, overall storage facility which is built up in tiers. One possible configuration of storage containers 11 on a total of three levels is illustrated in FIG. 5. In this case, the number of storage containers 11 connected in a row and the number of rows of storage containers 11 tiered above one another can be selected as desired depending on requirements and needs. The individual levels can be held together in a corresponding manner (not illustrated) via the head pieces by means of tie rods.

The design according to the invention of the head pieces 20 with the integrated flow ducts 24 and optionally the connection openings 28 and also the inserted seals 25 enable the individual storage containers 11 to be connected to one another particularly simply and cost-effectively and functionally reliably in a modular manner, since corresponding pipework is omitted. This also has clear advantages with regard to accident safety, since possible damage to corresponding connection conduits is no longer possible.

In order to improve the use of space, i.e. to increase the packing density of the storage containers 11, in a development of the invention provision can be made for the storage containers 11 of one row of storage containers to be arranged, in contrast to the configuration of FIG. 5, offset in each case with respect to the storage containers 11 of the directly adjacent row of storage containers. By this means, the storage containers 11 of one row fit better into the gaps in the storage containers 11 of the directly adjacent row. However, this presupposes a different design of the outer contour of the head pieces 20 in the region where they are connected to the next level. In the region where they are connected, the contour must not be essentially flat, as in FIG. 1, but has to be, for example, of undulatory or zigzag-shaped design.

Figure 3:
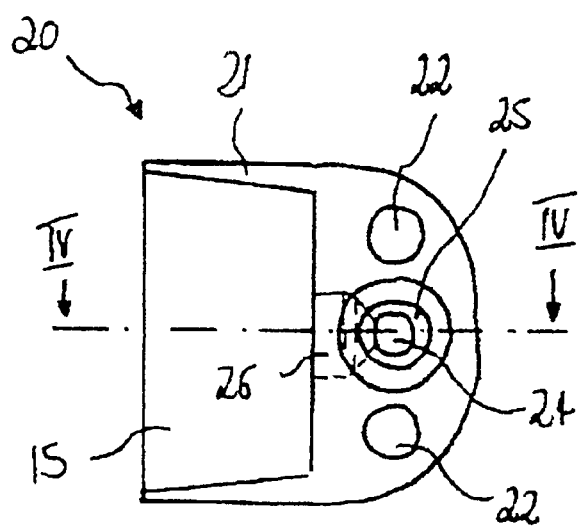
FIG. 3 shows a cross section through a head piece used in the device according to the invention.
Figure 4:
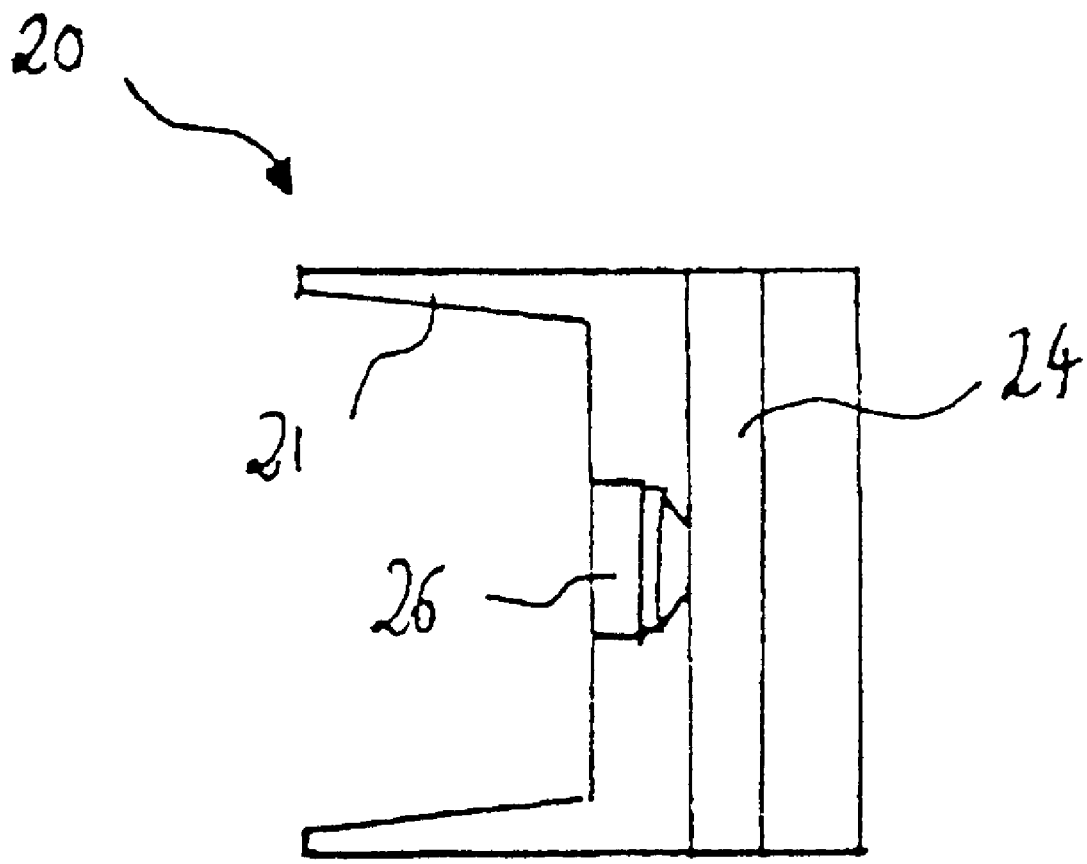
FIG. 4 shows a sectional view along the intersecting line IV—IV in FIG. 3.

In FIGS. 3 and 4, a view of a detail of the head pieces 20 is illustrated. These figures clearly reveal the manner in which the cavity 15 communicates with the flow duct 24 via the hole 26. The height of the side walls 21 tapering conically toward the free end of the head piece 20 can advantageously amount to 3 cm.

During operation of the device 10, the pressure of the compressed gas stored in the cavity 15 of the storage containers 11 ensures that the valve 27, which is designed as a nonreturn valve, remains in the open position. The compressed gas stored in the storage containers 11 can therefore emerge from the storage containers 11 and can be supplied via the flow duct 24 to a connection (not illustrated) for introducing and/or discharging the compressed gas.

In the event of damage to one of the storage containers 11, for example due to the container wall 12 tearing or bursting open, the falling gas pressure in the relevant storage container 11 ensures that the valve 27 is closed on account of the gas pressure prevailing in the flow duct 24. The gas emerging from the remaining storage containers 11 is therefore not able to escape through the damaged storage container 11, with the result that the device 10 can continue to be used in spite of the damaged storage container 11.

To replace the damaged storage container 11, the nuts 29 on the connecting elements 23 are released. This enables the individual storage containers 11 to be released from one another by being pulled off from the connecting elements 23. The damaged storage container 11 can now be replaced in a simple manner by a new storage container 11. The storage containers 11 are then joined together again in the manner described above.

The ability to freely vary the individual storage containers 11 in the device 10 enables storage systems to be provided which can be used even in spaces with a complex geometrical structure. As a result, a device 10 which can be used universally is provided for storing compressed gas. Furthermore, the device 10 can be adjusted individually in each case to the quantity and type of compressed gas to be stored.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A device for storing compressed gas, comprising a plurality of storage containers which each have a container wall which surrounds a cavity provided for storing the compressed gas, the storage containers being conductively connected to one another and each storage container having a head piece which is connected to the container wall, and at least one connection for introducing and discharging the compressed gas, the head pieces being arranged so as to respectively touch one another so that the storage containers are connected mechanically to one another in a modular manner so as to form a compact constructural unit.

2. A device as defined in claim 1, wherein the head piece is bonded to the container wall.

3. A device as defined in claim 2, wherein the head piece is soldered to the container wall.

4. A device as defined in claim 2, wherein the head piece is welded to the container wall.

5. A device as defined in claim 1, wherein the container wall is cylindrical.

6. A device as defined in claim 1, wherein each of the storage containers has a covering layer which is arranged on the container wall at least in partial regions of the storage container.

7. A device as defined in claim 1, wherein the storage containers each have an end region with a conical cross-sectional tapering of the container wall so as to hold the container in the head piece.

8. A device as defined in claim 1, wherein the storage containers are connected releasably to one another via the head pieces.

9. A device as defined in claim 1, and further comprising connecting elements provided to connect the storage containers together.

10. A device as defined in claim 9, wherein the connecting elements are rod-shaped.

11. A device as defined in claim 9, wherein each of the head pieces has at least one opening for holding one of the connecting elements.

12. A device as defined in claim 11, wherein each of the head pieces has two openings each configured to hold one of the connecting elements.

13. A device as defined in claim 11, wherein the at least one opening extends continuously over an entire width of the head piece.

14. A device as defined in claim 1, and further comprising a flow duct provided in each head piece for conducting the compressed gas therethrough, the flow duct extending continuously over an entire width of the head piece and communicates with the cavity of the storage container via a hole.

15. A device as defined in claim 14, wherein the flow duct has a sealing element in end-side end regions of the head piece.

16. A device as defined in claim 14, wherein a valve is arranged in the hole.

17. A device as defined in claim 16, wherein the valve is a non-return valve.

18. A device as defined in claim 1, wherein at least one of the head pieces has a connection opening for introducing and discharging the gas.

19. A device as defined in claim 1, wherein the storage container has a cover element at an end of the container wall which is opposite the head piece.

20. A device as defined in claim 19, wherein at least one of the head piece and the cover element consists of metal.

21. A device as defined in claim 20, wherein at least one of the head piece and the cover element consists of a cast metal.

22. A device as defined in claim 1, wherein the container wall is formed from a material which is suitable for absorbing forces in a longitudinal direction of the storage container.

23. A device as defined in claim 22, wherein the container wall material is at least one of metal, plastic and a fiber composite material.

24. A device as defined in claim 6, wherein the covering layer is formed from a material which is suitable for absorbing forces in a circumferential direction of the storage container.

25. A device as defined in claim 24, wherein the covering layer material is at least one of plastic and fiber composite material.

26. A device as defined in claim 1, wherein a plurality of rows of storage containers are arranged next to one another and are connected to one another by the head pieces so as to form an overall storage facility built up in tiers.

27. A device as defined in claim 26, wherein the storage containers in directly adjacent tiers of the overall storage facility are in each case arranged offset with respect to one another.

\* \* \* \* \*